US006611834B1

(12) United States Patent
Aggarwal et al.

(10) Patent No.: US 6,611,834 B1
(45) Date of Patent: Aug. 26, 2003

(54) CUSTOMIZATION OF INFORMATION RETRIEVAL THROUGH USER-SUPPLIED CODE

(75) Inventors: Gaurav Aggarwal, New Delhi (IN); Deepavan Chakrabarti, Bihar (IN); Pradeep Kumar Dubey, New Delhi (IN); Nitin Punamkumar Garq, Gujrat (IN); Sugata Ghosal, New Delhi (IN); Ashish Kumar Gupta, Mumbai (IN); Ashutosh Kulshreshtha, New Delhi (IN); Sreerama Kolluru Venkata Murthy, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/481,359

(22) Filed: Jan. 12, 2000

(51) Int. Cl.[7] .............................................. G06F 17/30
(52) U.S. Cl. .............................. 707/10; 707/2; 707/3; 707/103; 707/200; 707/201; 707/204
(58) Field of Search ................................ 707/200, 204, 707/103, 2, 3, 10; 709/201, 204

(56) References Cited

U.S. PATENT DOCUMENTS 5,826,253 A * 10/1998 Bredenberg ................ 707/2
6,138,155 A * 10/2000 Davis et al. ............... 709/224
6,289,346 B1 * 9/2001 Milewski et al. ........... 707/10
6,385,605 B1 * 5/2002 Suzuoka et al. ............ 707/4

* cited by examiner

Primary Examiner—Kim Vu
Assistant Examiner—Cam-Y T Truong
(74) Attorney, Agent, or Firm—Whitham, Curtis & Christofferson, P.C.; T. Rao Coca

(57) ABSTRACT

A user at a client machine can customize components of a database search performed at a server. The user does this by sending executable code to the database server. Software code runs as middleware on the database server machine to communicate between the database server and the client and performs the functions of supplying the client with vital information required for generating code which will be used for customizing various processes of the database retrieval session. Typically, the server comprises a set of database servers and the middleware runs on each database server machine to communicate between the database servers and the client. The middleware provides a virtual machine on which the user-supplied code written in a virtual machine language is executed, giving a uniform interface across the set of database servers on which the same user-supplied code will be executed ensuring that the user-supplied code executes under database server specified access privileges.

23 Claims, 3 Drawing Sheets

CUSTOMIZATION OF INFORMATION RETRIEVAL THROUGH USER-SUPPLIED CODE

BACKGROUND OF THE INVENTION

1. Field of the Invention

The present invention generally relates to the field of information search and retrieval in a client-server environment and, more particularly, to a system that provides larger benefits for a multimedia data search which typically requires interactive searching capabilities to capture the user perception of a search and the user preferences.

2. Background Description

Most information search and retrieval engines offer a set of configurable options to the users, for both customizing the interface and for tuning the search parameters. These database servers often explicitly or implicitly use relevance feedback techniques to infer the user perception. They allow the user to send certain options along with the query for a search as discussed by W. M. Shaw in "Term-relevance computations and perfect retrieval performance", *Information Retrieval and Management*, 11(4), 1995, pp. 491–498, and by Gerard Salton and Michael J. McGill in *Introduction to Modern Information Retrieval*, McGraw-Hill Book Company, 1983.

SUMMARY OF THE INVENTION

It is therefore an object of the present invention to provide a way for a user at a client machine to customize components of a database search performed at a server.

According to the invention, there is provided a novel way in which, in addition to the query, the user himself (herself) sends executable code to the database server. Current systems do not allow a user to send code to the server. In general, this may not be useful since a typical user may not be able to write the code. In addition, there are security concerns. However, for the cases where an advanced user may be able to supply code or where superior code from third-party vendors is available for specific database search tasks, there can be tremendous gains in customization of a search and retrieval session. The security concerns are handled by enforcing the user-supplied code to adhere to certain interface specified by the server and by giving restricted execute permissions to the user-supplied code on the server machine.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
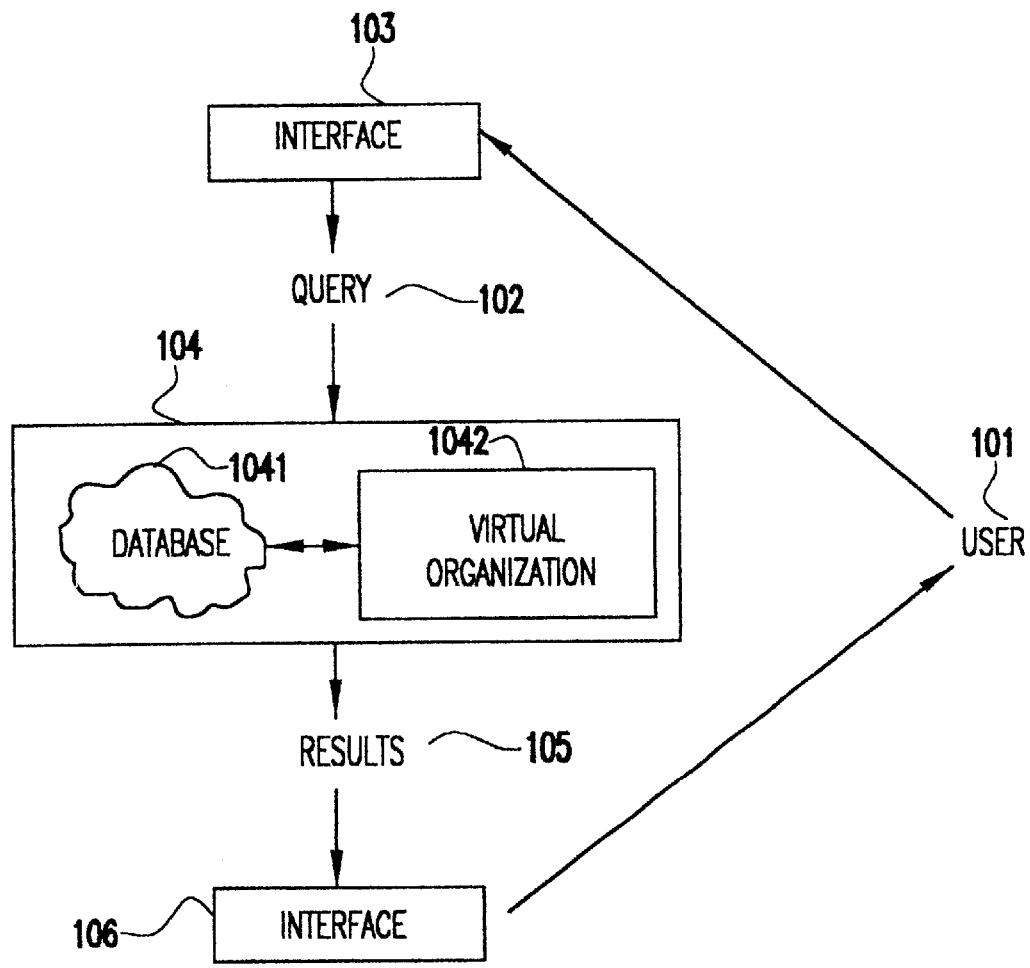
FIG. 1 is a block diagram showing the components of a typical database search session.

A typical information search and retrieval session in a client-server environment consists of the following four components as shown in FIG. 1. The user 101 provides a query 102 via an interface 103 to a server 104 on which a database is installed. The interface is typically a software program, such as a search engine, provided by the server 104 and running on a client machine, such as a personal computer (PC). The query 102 may be communicated over a distributed network, such as the Internet, to the server machine 104 on which the database is installed. The physical database 1041, along with some virtual organization 1042 into data structures, enables an effective and efficient search. The results 105 of the search are communicated over the network to the client machine and supplied by the interface 106 to the user 101 to show the results of the search to the user. The interfaces 103 and 106 are typically one and the same.

Each data search sessions essentially starts with a query. The user 101 uses an interface 103 provided by the server 104 to formulate the query which is sent to the database search module. This query may be pre-processed before being passed to the database search and retrieval module. The database 1041 itself consists of some virtual organization 1042 along with the actual data. This virtual organization 1042 consists of the features extracted from the data and organized into a data structure that supports efficient searches on queries supplied by the user. The search results 105 are obtained by indexing this data structure with the query. The search results may be post-processed by a filter (not shown) before being shown to the user using the interface provided by the server.

We describe our invention in a networked environment, where the database search and retrieval module is termed as the server. The user is the client and is located over the network. A global distributed network, such as the Internet, is contemplated for the environment of the invention.

In prior art information retrieval systems the physical database and the user-interface are pre-determined by the server. However, since a large number of users may want to query the server and each user may have different requirements, the server provides some configurable options for each component. The user-supplied query is obviously determined by the client and is used as is. These configurable options are usually limited in number. Typical environments are search engines like Altavista, Yahoo, Excite, Dejanews, Virage, QBIC, and similar search engines.

This invention addresses in general a server-client database search engine but offers particular advantages for multimedia search engines. These engines search, for example, a database of images for those that match the user-supplied query image in the user visual perception sense or a library of video clips for those that match the user-supplied video clip, again in the user perception sense. The user perception as a matching parameter is absolutely indispensable for such multimedia searches since there is no absolute match of two images or two video clips other than pixel-by-pixel identity, which is very rare.

In this invention, we provide an information retrieval system which gives the client an ability to send code for customizing any of the components mentioned above with reference to FIG. 1, where the code consists of instructions that are executed on the server machine. This is in contrast to the prior-art systems where the user may only choose from a set of options that are pre-determined by the server. A server may allow unrestricted number of options by, for example, letting the user specify the background image or color of a browser during searches or the spatial placement of the search results in the browser. However, even though the server may allow the client to specify potentially infinite number of options, the server does not execute any instructions or commands sent by the client on the server machine. Our invention provides a system in which the client sends code to the server where the code will be executed to perform user-specific customization of the various components. User-supplied code for customization can help multimedia database searches since the user may freely express his (her) own perception without the computer system having to guess or infer the user perception through relevance feedback and machine learning techniques as employed by prior-art systems. Furthermore, a "naive" user may not have to write the customization code himself (herself). He (she) can simply use "plug-outs"; i.e., code snippets that go and plug out at the server end, which code snippets are sold or given away by third-party vendors having expertise in restricted fields.

Figure 2:
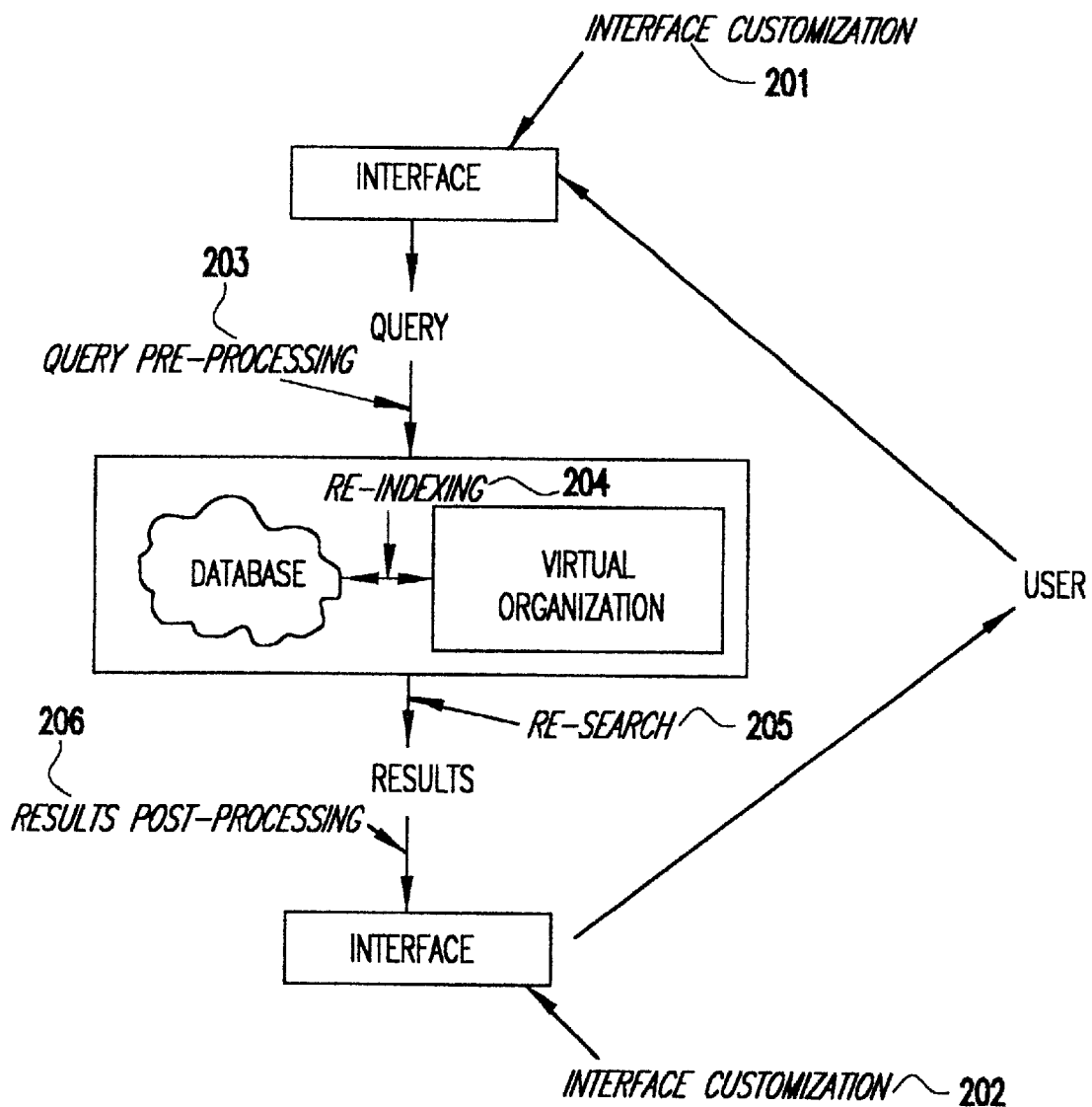
FIG. 2 is a block diagram showing the customization of a database search session through client-supplied code.

This client-initiated customization can be performed for different components of a database search session as shown in FIG. 2. A large number of specific embodiments that fall within the scope of "customization through client code" may be envisioned by those skilled in the art. FIG. 2 shows, for example, user supplied code 201 for interface customization for query and user supplied code 202 for interface customization for outputting results, user supplied code 203 for preprocessing, user supplied code for actual processing, including code 204 for re-indexing and code 205 for re-search, and user supplied code 206 for post-processing. As illustrations, we list below some specific examples.

User-supplied Code for Query Pre-processing

Example 1.

The user asks the database server to translate the query text by default before performing the search; e.g., from French to English. The user sends the code for translation once and then send queries in the language in which he or she is comfortable. These will be pre-processed translated at the server end before being used for search and retrieval.

Example 2.

The user has a Red-Green-Blue (RGB) color query image, but the database images are represented in Hue-Saturation-Value (HSV) color format. The user sends the code for RGB to HSV conversion to the server side, because he (she) is more comfortable working with RGB images, or does not have resources to do color format conversion.

Example 3.

The user uses some non-standard compression technique for the query image to save transmission bandwidth. This compressed image can now be sent along with the decompression code (or, alternatively, decompression code can be sent once in advance). The server uses the decompression code on the compressed image to extract the query image which in turn is used for database search.

Example 4.

The user might be searching a database of video clips that is stored in the interlaced broadcast TV format. However, computers require progressive encoding of frames and hence a format conversion is necessary. A user may then supply the code for conversion of progressive video to interlaced video along with a query which is in the progressive format. The query is pre-processed with this code at the server side before being used to index the database. There may be similar video format conversion requirements; e.g., for 4:2:2–3:1:0 video, etc. Such pre-processing code may be difficult for an ordinary user to write but could be available from third-party vendors.

User-supplied Code for Actual Processing

Example 5.

The user wants to retrieve images with certain topological arrangement. To do this, the user supplies a search function that uses the existing virtual database organization; i.e., the indices of the database. In such cases, the user-supplied code is only some small part of the search function and it uses as is the search indices. For example, in the context of Content-Based Image Retrieval (CBIR) the user may be searching for multiple objects in the query image. State of the art image retrieval systems use image segmentation and search for segments matching those (objects) of user interest. However, the user may in addition desire certain topological properties of the segments; e.g., segment A should fall on the left of segment B and on top of segment C. The server can try to learn this topological relationship using relevance feedback techniques as discussed in prior art prior art systems. However, such techniques are time and bandwidth consuming and often inaccurate in estimating the exact user perception and requirements. This can be avoided if the client supplies code that checks for the topological properties desired by the user. This code modifies the computed distance from the query image and hence changes the ranking of the retrieved images.

Example 6.

As another example, the user wants to retrieve images containing his (her) definition of the background. The user may be the best person to describe his (her) notion of backgrounds during image searches. The retrieval performance of segmentation-based CBIR may increase if the search module utilizes heuristic classification of segments as backgrounds or foregrounds; i.e., objects. The user may be able to code this information for each query but it is extremely difficult for the server to have a robust algorithm of such classification which succeeds on a variety of images, because background may be a subjective concept.

Example 7.

The user customizes the database virtual organization also. Thus, if the user changes the similarity metric (distance measure), uses a different set of features or does a re-weighting of the feature dimensions used for matching then the entire database needs to be processed using the user supplied code and new indices must be generated, making scalability an important issue. However, such changes will seldom be done with each query. A user typically would set his search preferences once in a while (e.g., once in two weeks, a month) and would be willing to wait for a few hours to configure the database to suit his (her) requirements. The user first requests for a complete reorganization of the database using his (her) supplied code. The server creates new indices and stores them for the user who can then use them for all future queries. For example, a user might want to look for different types (texture) of cloth when furnishing his (her) house and would be ready to wait for few hours while the database is reorganized on texture keys rather than the default which might have been color keys. After the reorganization the user can search for texture-based queries using the user-supplied similarity metric based on texture properties.

User Supplied Code for Results Post-processing

User-supplied code can be used for post-processing the results of a database search at the server end. In this case, the database organization is not affected since the user-supplied code is only executed on the search results to filter out unwanted results. This is demonstrated by the following examples.

Example 8.

The user sends code that filters out images that are greater than 50 Kb in size or video that is shorter than 5 seconds and lower than specified resolution. A server cannot supply all such arbitrary post-processing options to the users but a user may well be able to send the code for his (her) specific needs.

Example 9.

The user wants to use some proprietary compression or encryption scheme before the output images are sent to him (her).

Example 10.

The user wants only those audio clips that contain male voice and not female voice. The server may not know how to do this whereas an expert user or a third-party vendor can develop a filter using signal processing domain knowledge to identify male voice from female voice.

Example 11.

The user may want to do format conversion on the retrieved results just as format conversions may be required at the pre-processing stage. Examples for video processing include interlaced to progressive, NTSC (National Television Standards Committee) to PAL (Phase Alternate Line), etc.

It is efficient to do such post-processing steps at the server end since the user need not download the search results which would anyway be filtered by the post-processing filter. There can be several examples where the filter is simple for a user to code or buy from third-party vendors but which the server would usually not contain in its limited set of options to the user, like a filter on word count or an advanced pattern match. In addition, for multimedia searches a lot of bandwidth may be saved if non-matching results are not downloaded to the client.

User-supplied Code for Interface Customization

Another important aspect of client initiated customization is configuration of the user interface. A user may just want to change the look and feel of the interface of the search engine according to his (her) requirements and preferences. The server can only provide some options. But, if the user can send code, then uniform user-preferred appearance and functionality can be achieved, for example across different search engines. The extent of this customization would be restricted by the capabilities of the server but the user-supplied code can execute to produce an interface with user-specified dialog boxes, controls, background, etc.

Specific Implementation

We next describe a system which can used for implementing the invention. A user can send a certain code to various information retrieval engines. As mentioned earlier, the user may get this code from either a third party vendor or write it himself (herself). In most cases, the database server needs to send substantial information to the client before the client can generate a plug-out and send to the server for customizing some task at the server-end. This information may include the format of the query results, the Application Program Interface (API) for distance function calculations and the details about internal data structures used for the virtual organization of the database, among other things. The client software uses this information to generate a plug-out which can execute on the server machine. In the preferred embodiment, it is possible to generate a plug-out for some specific task once and send it to different database search engines. Thus, the plug-out code needs to be generic enough to execute on different platforms on which the database server code might be running. This is achieved by using a middleware at the server end to which all user queries and customization requests are routed as shown in FIG. 3.

Figure 3:
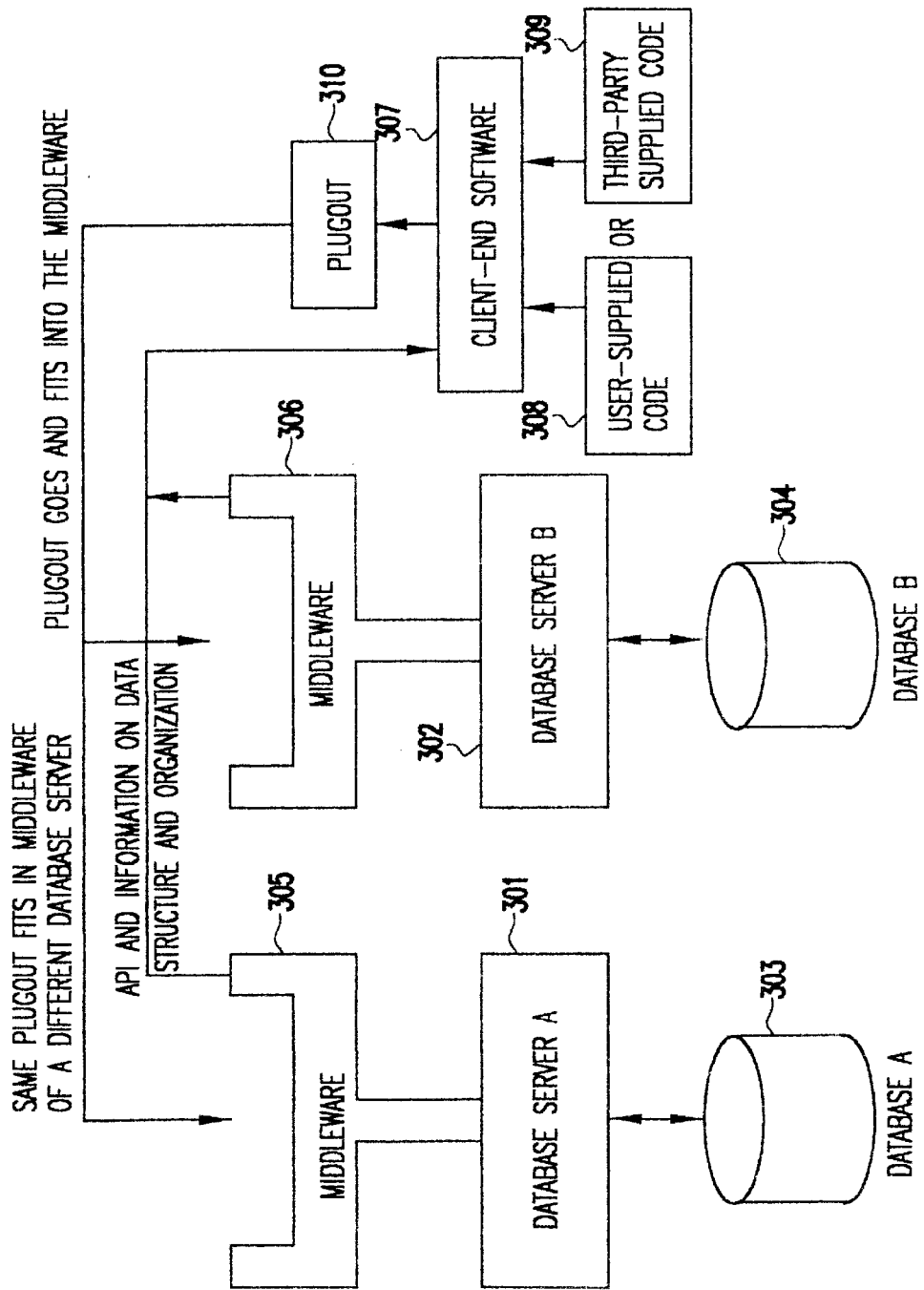
FIG. 3 is a block diagram of the system architecture on which the present invention is implemented.

In FIG. 3, there is a set of database servers, here represented by servers 301 and 302 and corresponding databases 303 and 304. Middleware 305 and 306 are respectively provided for the servers 301 and 302. This middleware provides a uniform virtual view of the retrieve module across the set of database servers to the client, for the purposes of writing customizable code. The middleware also provides the client with all the information required by the client that the database server is willing to supply. Specifically, the middleware 305 and 306 provides API and information on data structures and organization to the client-end software 307. Thus, inter-operability of the plug-out 308 generated by the client-end software 307 based on user-supplied code 309 or third-party supplied code 310 on heterogeneous server platforms can be achieved since only the user-supplied code 309 or third-party supplied code 310 only has to conform to the middleware interface which remains uniform across the different server platforms. The user-supplied code goes and plugs into this middleware and would be executed on as-is required basis during a database retrieval session. In addition, the middleware ensures that the plug-out code 308 executes only under certain restricted privileges and does various authentication, security and sanity checks on it.

In a specific embodiment, this middleware may be the Java Virtual Machine (JVM) on which Java byte code can be executed. There are different JVM implementations available, each for the different machine platform on which the JVM enables Java The JVM-based middleware would perform the security and sanity checks on the incoming user-supplied code which will now be in the Java programming language. Such security and sanity checks are widely implemented by all JVM and are an integral feature of the Java programming language. In addition, it will provide a library of classes that the user-supplied code may invoke to achieve the computation tasks. Although JVM is a specific embodiment, more efficient implementations of a middleware are also possible which can be optimized for the specific database search tasks rather than the general purpose JVM implementation.

A typical database retrieval session would start with the client software 307 requesting the middleware 305 and 306 for a list of possible configurations; i.e., figuring out which of the above mentioned customization capabilities does the corresponding servers 303 and 304 provide. The client software may then ask for the information required for generating and sending a plug-out 308 to customize the user's retrieval session. This is followed by generation of a plug-out at the client side using the information received from the middleware regarding the API data structures and various formats. In the preferred embodiment, this plug-out would be generated at a virtual machine code level or in a general purpose script language; e.g., the plug-out might be a compression routine at the Java byte code level. The middleware provides a virtual machine level view of the server to the plug-out for its execution. This ensures that a client can use the same plug-out for customizing different search engines running on different platforms. The only requirement is that they provide this virtual machine view to which the plug-out can go and attach itself. In an alternative embodiment, there may be no restriction on the use of a virtual machine language for generating the plug-out and the list of information sent by the middleware to the client would include the database platform for generating the platform specific machine code at the client side. The sharing of middleware and API information, as well as the plug-out, need not happen in every retrieval session. The plug-out may be generated in one session, and subsequently just stored, either as a temporary or permanent user profile, at the server and dynamically used as needed during retrieval.

We point out that such customization of information retrieval engines through user-supplied code can be done for different data modalities, including text, audio, images and video.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. In a client-server database system, a method of customization of information retrieval comprising the steps of:

supplying by the server to the client information required by the client to generate client-supplied customization code for customizing a component of said database system providing said information retrieval where the customization code provided by the client to the server is able to be executed on the server; and sending by the client to the server queries and executable customization code for doing various tasks of said information retrieval system component by the server.

2. The method recited in claim 1, wherein the customization code from the client is sent with each query to the server.

3. The method recited in claim 1, wherein the customization code from the client is sent in batches as a user profile.

4. The method recited in claim 1, wherein the server allocates space to maintain client-supplied customization code for different clients, and retrieves and runs appropriate customization code dynamically in response to a client query.

5. A method as recited in claim 1, wherein the client-supplied customization code is used for pre-processing the query given by the user on the server machine.

6. A method as recited in claim 5, wherein the client-supplied customization code is used for compression, decompression, encryption, decryption of user queries.

7. A method as recited in claim 5, wherein the client-supplied customization code is used for translation of user queries.

8. A method as recited in claim 5, wherein the client-supplied customization code is used for format conversion of user queries.

9. A method as recited in claim 1, wherein the client-supplied customization code is used during the actual processing for search and retrieval.

10. A method as recited in claim 9, wherein the client-supplied customization code does use existing indices for search and retrieval.

11. A method as recited in claim 10, wherein the client-supplied customization code is used for matching of spatial relationships and background definition during content-based image retrieval.

12. A method as recited in claim 9, wherein the client-supplied customization code is used for reorganization of the database and generation of new indices for search and retrieval.

13. A method as recited in claim 12, wherein the client-supplied customization code is used to change relative feature importance, add new features, define different metrics for computing the distance between the user query and a target match in the database.

14. A method as recited in claim 1, wherein the client-supplied customization code is used for post-processing information retrieval results before being shown to the user.

15. A method as recited in claim 14, wherein the client-supplied customization code is used for compression, decompression, encryption or decryption.

16. A method as recited in claim 14, wherein the client-supplied customization code is used for format conversion of results.

17. A method as recited in claim 14, wherein the client-supplied customization code is used for filtering responses.

18. A method as recited in claim 17, wherein filtering is based on one of word count, file size, video length, and male versus female voice in audio clips.

19. A method as recited in claim 14, wherein the client-supplied code verifies the validity of the search results to ensure that the searched documents are valid, usable, virus-free and in a correct format.

20. A method as recited in claim 1, wherein the client-supplied customization code is used for customizing a user interface of the search engine.

21. A method as recited in claim 20, wherein customization of the user interface includes one of user registration, query formulation, result display, and user configuration.

22. A client-server database system comprising:

a server supplying to a client information required by the client to generate client-supplied customization code for customizing a component of said database system providing said information retrieval where the customization code provided by the client to the server is able to be executed on the server; and a plurality of clients sending to the server queries and executable customization code for doing various tasks of said information retrieval system component by the server, the server allocating space to maintain client-supplied customization code for different clients, and retrieving and running appropriate customization code dynamically in response to a client query.

23. A client-server database system as recited in claim 22, wherein the client-supplied customization code is used for matching of spatial relationships and background definition during content-based image retrieval.

* * * * *